Patented Feb. 9, 1954

2,668,800

UNITED STATES PATENT OFFICE 2,668,800

PLASTIC COMPOSITION COMPRISING A VINYL HALIDE POLYMER AND A PHOSPHORUS CONTAINING COMPOUND AS A PLASTICIZER THEREFOR

Franklin Johnston, St. Albans, W. Va., assignor to Union Carbide and Carbon Corporation, a corporation of New York No Drawing. Application September 22, 1951, Serial No. 247,899

13 Claims. (Cl. 260—30.6)

1

This invention relates to the production of a new class of diesterified phosphono derivatives of carboxylic acid esters, amides and nitriles having at least two functional groups; and more especially it concerns products of the reaction of organic phosphite diesters with a compound selected from the class consisting of (1) the polyfunctional esters of olefine polycarboxylic acids having the double bond of at least one carbonyl carbon atom conjugated with another double bond in the molecule; (2) the corresponding amides, N-substituted amides and nitriles; and (3) the mixed ester-amide, ester-nitrile and amide-nitrile derivatives of olefine mono- and polycarboxylic acids. The term "polyfunctional" is used herein to designate esters, amides and nitriles containing at least two groups selected from the esterified carboxyl groups, the amide groups and the nitrile group.

The invention further relates to the production of plastic compositions containing the novel diesterified phosphono derivatives of such carboxylic acid esters, amides and nitriles, and mixed ester-amides, ester-nitriles and amide-nitriles, wherein such derivatives function as plasticizers for the resins forming the basis of such composition.

The invention has important utility for the production of high boiling diesterified phosphono derivatives of saturated aliphatic polycarboxylic acid esters, amides and nitriles having from two to four functional carbon atoms and having a diesterified phosphono radical connected with a carbon atom beta to at least one functional carbon atom of an esterified carboxyl, an amide or a nitrile group.

The novel compounds of the invention may be represented by the formula

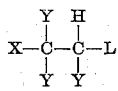

wherein X designates

wherein R represents a radical selected from the class consisting of the alkyl, aryl, aralkyl, cycloalkyl, alkenyl, alkoxyalkyl, aryloxyalkyl, cycloalkoxyalkyl and beta-halogen-substituted ethyl radicals; L designates a radical selected from the class of —COOR′, —CONH₂, —CONHR, —CONR₂ and —CN radicals wherein R′ designates the radicals represented by R with the exception of the aryl radicals; and each Y designates a radical selected from the class consisting of hydrogen, the aryl radicals, the alkyl radicals, and the group of radicals designated by L and by $(CH_2)_nL$ wherein $n$ is an integer from 1 to 5, and at least one Y is selected from the last-named group of radicals.

The new polyesters have potential utility as plasticizers for synthetic resins, and many thereof already have been shown to be efficient plasticizers for various vinyl resins. They possess flame-proofing characteristics contributing unique and desirable properties to thermoplastic resinous compositions. The new polyamides and polynitriles have potential utility as plasticizers and as starting materials for the production of other phosphorus-containing compounds.

Compounds of this new type may be produced in accordance with the invention by reacting the appropriate phosphite diesters with aliphatic, alicyclic, aralkyl, alkoxyalkyl, aryloxyalkyl, halogenated alkyl and certain heterocyclic esters of unsaturated di-, tri- and tetracarboxylic acids having a carbon to carbon double bond conjugated with the double bond of at least one carbonyl carbon atom; or with the corresponding amides, di- and tetrasubstituted amides, nitriles, and mixed ester-amides, ester-nitriles and amide-nitriles.

The reaction preferably is conducted with dry although not necessarily anhydrous reagents, and usually in the presence of a small amount—i. e., around 0.5% to 5%—of a condensation catalyst. The best results are secured with an alkaline catalyst, among which may be mentioned the alkali metals such as metallic sodium, metallic potassium, and metallic lithium; alkali metal amides such as sodamide; alkali metal hydrides such as sodium hydride and potassium hydride; alkali metal alcoholates (alkoxides) such as sodium methylate and ethylate; sodium napthalene; and the amines such as diethylamine and triethylamine. The alkali metal hydroxides such as sodium and potassium hydroxides are useful when dissolved in a solvent for the reactants, such as 1,2-dimethoxyethane.

Very effective catalysts are the alkali metal salts of phosphite diesters of the type

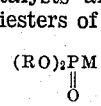

wherein M is an alkali metal atom and R has the meaning hereinafter designated. Corresponding salts of alkaline earth metals and of magnesium are less effective catalysts.

In one preferred form of the process the ester of the unsaturated carboxylic acid, or the corresponding amide or nitrile, is added in successive small increments to an agitated solution of the catalyst in the phosphite diester. The mixture usually is maintained at a reaction temperature between about 25° C. and about 125° C. However, temperatures as high as 200° C. may be employed. The addition is continued until at least one mole of the ester, amide or nitrile derivative of the unsaturated acid has been added to the solution of the phosphite diester for each mol of the latter present therein. The resultant crude reaction mixture is neutralized or slightly acidified with a suitable acid such as sulfuric, hydrochloric or phosphoric acid, or an organic acid such as acetic acid. Glacial acetic acid is preferred for this purpose. The neutralized reaction mixture then is filtered and/or washed with water; and the filtrate or washed mixture is fractionally distilled under subatmospheric pressure. The fraction containing the desired ester, amide or nitrile of the substituted-phosphono polycarboxylic acid is separately recovered.

The condensation reaction may be conducted in the presence of a volatile solvent for the reactants which is inert to the latter. The use of such a solvent is not essential; but it is desirable when the ester, amide or nitrile derivative of the unsaturated carboxylic acid used as starting material is a solid under the reaction conditions, or when such ester, amide or nitrile is a poor solvent for the phosphite diester or for the catalyst. Suitable solvents include ethers such as diethyl ether, dibutyl ether, the diethers of the glycols and dioxane; and aliphatic and aromatic hydrocarbons such as n-heptane, benzene and xylene.

Among the phosphite diesters useful in the process may be mentioned the methyl, ethyl, isopropyl, butyl, hexyl, n-octyl, 2-ethylhexyl, decyl, hexadecyl, phenyl, benzyl, cyclohexyl, allyl, crotonyl, beta-chloroethyl, beta-bromoethyl, beta-methoxyethyl, beta-ethoxyethyl, beta-butoxyethyl, beta-phenoxyethyl, tetrahydrofurfuryl and tetrahydropyranyl phosphite diesters.

The phosphite diesters may be produced by various procedures known in the art, as by reacting the appropriate alcohol with phosphorus trichloride according to the equation:

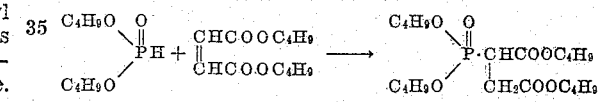

excess hydrogen chloride being removed from the reaction mixture substantially as rapidly as formed.

Esters of unsaturated polycarboxylic acids useful in the invention include those wherein the esterified carboxyl groups are attached to the same carbon atom, and those wherein such groups are attached to different carbon atoms. Among such esters are the dimethyl, diethyl, dibutyl, dihexyl, di-n-octyl, di(2-ethylhexyl), di-tetradecyl, dibenzyl, di(methoxyethyl), di(ethoxyethyl), di(butoxyethyl), di(cyclohexyl), di(phenoxyethyl), di(chloroethyl), di(bromoethyl), di(tetrahydrofurfuryl), diallyl and dicrotonyl esters of the following acids: maleic acid, fumaric acid, citraconic acid, ethyl maleic acid, itaconic acid, methylene malonic acid, ethylidene malonic acid, benzylidene malonic acid and glutaconic acid; the corresponding triesters of aconitic acid and of alpha methyl aconitic acid; and the corresponding tetraesters of ethylene tetracarboxylic acid, 1-propene-1,2,3,3-tetracarboxylic acid, and 1-butene-1,3,3,4-tetracarboxylic acid.

Among amides useful in the process may be mentioned fumaramide, maleamide, N,N,N',N'-tetramethyl maleamide, N,N,N',N'-tetrabutyl maleamide, N,N'-dimethyl fumaramide, N,N'-dibutyl fumaramide, fumaramide, N,N,N',N'-tetrahexyl maleamide, citraconic amide, N,N'-dimethyl and N,N,N',N' - tetraethyl citraconic amides, mesaconic amide, and N,N'-dialkyl mesaconic amides. Among nitriles useful as starting materials are fumaric acid dinitrile, maleic acid dinitrile, and the corresponding dinitriles of citraconic and itaconic acids. Mixed ester-amides, ester-nitriles and amide-nitriles of unsaturated compounds having two or more functional carbon atoms also are useful in the process. Examples thereof include the esters of fumaramic acid, such as the methyl, ethyl and butyl fumaramates; and similar esters of fumaramic acids substituted in the N-atom with one and those with two aliphatic or aryl groups, such as methyl N-methylfumaramate and the methyl ester of fumaranilic acid; ester-nitriles such as alpha-gamma-dicyanoglutaconic acid ethyl ester, methyl 2-cyanoacrylate, ethyl 3-phenyl-2-cyanoacrylate, ethyl 2-cyanocrotonate, and ethyl 3-methyl-2-cyanocrotonate; and amide-nitriles such as alpha-gamma-dicyanoglutaconic amide.

The overall reaction is illustrated by the following equation involving the reaction of dibutyl phosphite and dibutyl maleate to produce dibutyl 2(dibutylphosphono) succinate.

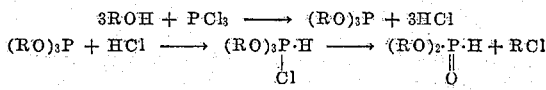

The following examples serve to illustrate the invention. In the examples, all parts are given in terms of weight, unless otherwise indicated.

EXAMPLE 1

To an agitated mixture of 194 parts (one mol) of dibutyl phosphite and 5 parts of sodamide in a flask provided with a reflux condenser were added 228 parts (one mol) of dibutyl maleate dropwise during thirty minutes while maintaining the reaction temperature at 50° C. by cooling with a water bath. Further stirring for 1.25 hours without cooling completed the reaction. The crude reaction mixture was neutralized with glacial acetic acid and filtered. The neutralized mixture was fractionally distilled under vacuum in a Claisen type still, and provided an 85% yield of dibutyl 2(dibutylphosphono)-succinate as a water white oily liquid boiling at 190° C. under a pressure of 1.2 mm. of mercury. It was an effective plasticizer for vinyl resins, as shown in the table.

EXAMPLE 2

One pound of metallic sodium was dissolved in 15 pounds of dibutyl phosphite, the mixture being cooled during the initial stages to maintain a temperature of 50° C. and afterwards heated to complete dissolution of the metal. On cooling the mixture the sodium salt of dibutyl phosphite separated from the excess dibutyl phosphite as a white waxy solid.

This slurry of catalyst was mixed with 53 pounds of dibutyl phosphite, and 113 pounds of di-2-ethylhexyl maleate were added over a two-hour period while maintaining the temperature at 50° C.–70° C. After heating the mixture to 80° C. for 15 minutes to complete the reaction and cooling to 40° C.–50° C., 0.26 gallon of acetic acid and 15 gallons of dibutyl ether were added and the mixture washed with 60 gallons of water. The mixture then was distilled in a stripping still to a kettle temperature of 200° C. at 4–5 mm. of mercury pressure, providing a 95.5% yield of di-2 - ethylhexyl 2 - (dibutyl-phosphono) succinate. This was an effective plasticizer for vinyl resins, as shown in the table.

EXAMPLE 3

144 parts (0.56 mol.) of diphenoxyethyl maleate in 300 parts of benzene were slowing added to a mixture of 109 parts (0.56 mol) of dibutyl phosphite and 15 parts of sodamide. After 1.5 hours to permit the weakly exothermic reaction to be completed, the reaction product was acidified with glacial acetic acid and filtered. After stripping off the volatiles from the filtrate to a kettle temperature of 165° C. under a pressure of 1 mm. of mercury the residue was distilled on a falling film type still under high vacuum. The di(phenoxyethyl) 2 - (dibutylphosphono) succinate was recovered as a viscous light yellow liquid boiling at 210° C. under a pressure of 0.3 mm. of mercury. It was compatible at 33% concentration in a vinyl chloride-vinyl acetate copolymer resin containing around 96% of the chloride.

EXAMPLE 4

205 parts (one mol) of di(beta-chloroethyl) maleate dissolved in 250 parts of dioxane were added dropwise to a stirred solution of 20 parts of sodamide in 194 parts (one mol) of dibutyl phosphite. The reaction was only slightly exothermic. The crude reaction mixture was neutralized with glacial acetic acid and filtered. The filtrate was stripped in a still to a kettle temperature of 150° C. at a pressure of 2.3 mm. of mercury, and the residue was distilled on a falling film type still, yielding a quantity of di(beta-chloroethyl) 2-(dibutylphosphono)succinate as a viscous light red liquid boiling at 195° C. under a pressure of 0.4 mm. of mercury.

Following the general procedure described herein, using equimolar proportions of the reactants, the reaction of dibutyl itaconate and dibutyl phosphite yielded dibutyl 2-(dibutylphosphonomethyl)succinate, boiling at 211° C. under a pressure of 2.4 mm. of mercury; di(tetrahydrofurfuryl)maleate and dibutyl phosphite yielded di-(tetrahydrofurfuryl) 2 - (dibutylphosphono) - succinate, a water white liquid boiling at 185° C. under a pressure of 0.5 mm. of mercury; tetraethyl ethylenetetracarboxylate and dibutyl phosphite yielded tetraethyl 2-(dibutylphosphono)-bimalonate, an oily liquid having a specific gravity of 1.105 at 20° C. and a refractive index at 30° C. of 1.4480; diallyl maleate and dibutyl phosphite yielded diallyl 2-(dibutylphosphono)succinate as an oily liquid boiling at 122° C. under a pressure of 0.35 mm. of mercury; triethyl aconitate and dibutyl phosphite yielded triethyl 2-(dibutylphosphono) tricarballylate as an oily liquid boiling at 135° C. under a pressure of 1 micron of mercury; tributyl aconitate and dibutyl phosphite yielded tributyl 2-(dibutylphosphono)tricarballylate as an oily liquid boiling at 171° C. under a pressure of 1 micron of mercury; di-(2-ethylhexyl)maleate and dicyclohexyl phosphite yielded di-(2-ethylhexyl) 2-(dicyclohexylphosphono)succinate as a syrupy liquid boiling at 156° C. under a pressure of 1 micron of mercury; dibutyl maleate and diphenyl phosphite yielded dibutyl 2-(diphenylphosphono)succinate as an oily liquid boiling at 149° C. under a pressure of 5 microns; di(methoxyethyl) maleate and dimethoxyethyl phosphite yielded di(methoxyethyl) 2-(dimethoxyethylphosphono)succinate as an oily liquid boiling at 185° C. under a pressure of 0.7 mm. of mercury; N,N,N',N'-tetramethyl maleamide and dibutyl phosphite yielded N,N,N',N'-tetramethyl 2-(dibutylphosphono)succinamide as an oily liquid boiling at 207° C. under a pressure of 2.1 mm. of mercury; dibutyl maleate and dibenzyl phosphite yielded dibutyl 2-(dibenzylphosphono)succinate as an oily liquid boiling at 145° C. under a pressure of 10 microns of mercury; dibenzyl maleate and dibutyl phosphite yielded dibenzyl 2-(dibutylphosphono)succinate as a liquid boiling at 156° C. under a pressure of 13 microns of mercury; diethyl benzylidene malonate and dibutyl phosphite yielded diethyl 2 - (alpha-dibutylphosphonobenzyl)malonate as an oily liquid boiling at 149° C. under a pressure of 9 microns of mercury; ethyl 3-phenyl-2-cyanoacrylate and dibutyl phosphite yielded ethyl 2-cyano-3-phenyl-3-(dibutylphosphono)-propionate as an oily liquid boiling at 149° C. under a pressure of 0.05 mm. of mercury; dibutyl maleate and di-2(methylcyclohexylmethyl)-phosphite yielded dibutyl 2-(di-2-methylcyclohexylmethylphosphono)succinate as an oily liquid boiling at 156° C. under a pressure of 6 microns of mercury; ethyl 2-cyano-3-phenylcrotonate and dibutyl phosphite yielded ethyl 2-cyano- 3 -(dibutylphosphono)hydrocinnamate as an oily liquid boiling at 169° C. under a pressure of 1 mm. of mercury; di-(2-ethylhexyl) - maleate and di-(2-chloroethyl)phosphite yielded di-(2-ethylhexyl) di-(2-chloroethylphosphono)-succinate; di-3-methoxybutyl maleate and dibutyl phosphite yielded di-3-methoxybutyl 2-(dibutylphosphono)succinate as a liquid boiling at 156° C. under a pressure of 2 microns of mercury; and di-(2-methylcyclohexylmethyl)-maleate and dibutyl phosphite yielded di-(2-methylcyclohexylmethyl) 2 - (dibutylphosphono)succinate as a liquid boiling at 156° C. under a pressure of 2 microns of mercury. These compounds were compatible with commercially available vinyl chloride-vinyl acetate copolymer resins containing around 96% or more of the chloride in the polymer in the weight ratio of 1:2 or more and had utility as plasticizers.

Similarly, the reaction of fumaric dinitrile and dibutyl phosphite yielded dibutylphosphonosuccinodinitrile as an oily liquid boiling at 170° C. under a pressure of 3 mm. of mercury; alpha-cyanocinnamic acid amide and dibutyl phosphite yielded 2-cyano-3-(dibutylphosphono)-3-phenylpropionamide, as a solid melting at 105° C.–106° C.; diethyl dicyanomaleate and dibutyl phosphite yielded diethyl 2,3-dicyano-2-(dibutylphosphono)succinate as an oily liquid boiling above 104° C. under a pressure of 4 mm. of mercury; and di-(beta-chloroethyl) maleate and dibutyl phosphite yielded di-(beta-chloroethyl) 2-(dibutylphosphono)succinate as a viscous liquid boiling at 195° C. under a pressure of 0.4 mm. of mercury.

Many of the novel products of the invention are clear, viscous liquids which are suitable as plasticizers and modifying agents for a number of commercially available resins and plastics, and particularly for vinyl resins formed by the polymerization of at least one vinyl compound including a vinyl halide, such as the polyvinyl chlorides and the copolymers of vinyl chloride and vinyl acetate, and especially those comprising predominantly a vinyl halide polymerized therein. They impart flame-resistant characteristics to plastic compositions containing them.

The following are representative compounds of the invention which are compatible with around twice their weight of vinyl resins containing at least a major portion of a vinyl halide in the polymer, such as the polyvinyl chlorides and the vinyl chloride-vinyl acetate copolymer resins, and are useful as plasticizers for such resins: di(tetrahydrofurfuryl) 2-(dibutylphosphono) succinate, tetraethyl dibutylphosphonobimalonate, diallyl 2-(dibutylphosphono) succinate, triethyl (dibutylphosphono) tricarballylate, tributyl (dibutylphosphono) tricarballylate, di(2-ethylhexyl) 2-(dicyclohexylphosphono) succinate, dibutyl 2-(diphenylphosphono) succinate, di - (methoxyethyl) 2 - (dimethoxythylphosphono) succinate, dibutyl 2-(dibenzylphosphono) succinate, dibenzyl 2-(dibutylphosphono) succinate, diethyl 2-(alpha-dibutylphosphonobenzyl) malonate, dibutyl 2-(di-2-methylcyclohexylmethylphosphono)-succinate, N,N,N',N'-tetramethyl 2-(dibutylphosphono) succinamide, ethyl 2-cyano-3-phenyl-3-dibutylphosphonopropionate, ethyl 2-cyano-3-(dibutylphosphono) - hydrocinnamate, di - 3-methoxybutyl 2 - (dibutylphosphono) succinate and di-2-methylcyclohexylmethyl 2-(dibutylphosphono) succinate.

The table illustrates the attractive combination of mechanical properties and low temperature flexibility imparted to a representative commercially available resinous copolymer of vinyl chloride and vinyl acetate containing 95% of the chloride in the polymer and having an average molecular weight above 25,000, by incorporating therein around 35% or more of certain representative products of the invention. The table also indicates the resistance offered by the products to extraction thereof from the resins by oil and by water. For comparison, similar data are presented for a similar resin containing a like amount of dioctyl phthalate, a widely used plasticizer for such resin.

difficultly processable resinous plasticizers, while possessing a processing advantage because of its greater fluidity at normal processing temperatures. The dibutyl 2-(dibutylphosphono) succinate and the di-(2-ethylhexyl) 2-(dibutylphosphono) succinate also appear to have excellent utility as plasticizers and for other purposes.

The term "hydrocarbyl" is used in the appended claims to designate a univalent hydrocarbon residue.

This application is a continuation-in-part of my copending application, Serial No. 36,418, filed July 1, 1948.

I claim:

1. A plastic composition comprising a vinyl resin containing a vinyl halide in the polymer and, as a plasticizer therefor, a hydrocarbyl ester of a saturated polycarboxylic acid having two to four esterified carboxyl groups and having a di-hydrocarbyl-substituted phosphono radical connected with a carbon atom beta to the carbonyl carbon atom of an ester group.

2. A plastic composition comprising a vinyl resin containing a vinyl halide in the polymer and, as a plasticizer therefor, a dialkyl ester of a dialkylphosphono-substituted saturated aliphatic dicarboxylic acid.

3. A plastic composition comprising a vinyl resin predominantly composed of vinyl chloride polymerized therein and, as a plasticizer therefor, a hydrocarbyl ester of a saturated polycarboxylic acid containing two to four aliphatic esterified carboxyl groups and having a di-hydrocarbyl-substituted phosphono radical connected with a carbon atom beta to the carbonyl carbon atom of an ester group.

4. A plastic composition comprising a vinyl resin of the class consisting of the polyvinyl chlorides and the copolymers of vinyl chloride and vinyl acetate and, as a plasticizer therefor, a dialkyl ester of 2-(dibutylphosphono)-succinic acid.

5. A plastic composition comprising a vinyl resin of the class consisting of the polyvinyl

Table

| | Physical Properties of the said Vinyl Resin Containing the Plasticizer | | | |
|---|---|---|---|---|
| | Percent of Plasticizer in the Composition by Weight | ASTM Stiffness Modulus, lbs./sq. in. | Flex Temperature, °C. | Percent Extraction |
| | | | | Oil** | H²O** |
| Dibutyl 2(dibutylphosphono)succinate | 34.9 | 580 | −25.7 | 12.3 | 0.9 |
| Dibutyl 2(dicyclohexylphosphono)-succinate | 40.5 | 545 | −14.2 | 3.0 | 0.9 |
| Dicyclohexyl 2(dibutylphosphono)succinate | 42.0 | 580 | −8.0 | 2.5 | 0.6 |
| Di(2-ethylhexyl)2(dicyclohexyl-phosphono)-succinate | 42.0 | 500 | −19.5 | 8.3 | 0.9 |
| Di(2-ethylhexyl)2(dibutylphosphono) succinate | 38.6 | 700 | −36.7 | 18.2 | 0.2 |
| Dioctyl phthalate* | 36.5 | 745 | −32.0 | 18.7 | 0.2 |
| A commercially available resinous plasticizer* | 45 | 600 | −8.0 | 4.4 | 1.1 |

*For comparison.
**At 25° C.

In mechanical properties, low temperature flexibility, and resistance to extraction by oil and by water at 25° C., the aforesaid vinyl resin stocks containing as plasticizer these products of the invention are essentially the equivalent of similar stocks containing dioctyl phthalate.

The dibutyl 2 - (dicyclohexylphosphono) succinate offers the particular advantage as a plasticizer for vinyl chloride-vinyl acetate copolymer resins that it confers upon such resins properties imparted thereto by commercially available but chlorides and the copolymers of vinyl chloride and vinyl acetate and, as a plasticizer therefor, a hydrocarbyl ester of a saturated polycarboxylic acid having two to four esterified carboxyl groups and having a di-hydrocarbyl-substituted phosphono radical connected with a carbon atom beta to the carbonyl carbon atom of an ester group.

6. A plastic composition comprising a vinyl resin of the class consisting of the polyvinyl chlorides and the copolymers of vinyl chloride and vinyl acetate and, as a plasticizer therefor, dibutyl 2-(dibutylphosphono)succinate.

7. A plastic composition comprising a vinyl resin of the class consisting of the polyvinyl chlorides and the copolymers of vinyl chloride and vinyl acetate and, as a plasticizer therefor, dibutyl 2-(dicyclohexylphosphono)succinate.

8. A plastic composition comprising a vinyl resin of the class consisting of the polyvinyl chlorides and the copolymers of vinyl chloride and vinyl acetate and, as a plasticizer therefor, di-(2-ethylhexyl) 2-(dibutylphosphono)succinate.

9. A plastic composition comprising a vinyl resin of the class consisting of the polyvinyl chlorides and the copolymers of vinyl chloride and vinyl acetate and, as a plasticizer therefor, dicyclohexyl 2-(dibutylphosphono)succinate.

10. A plastic composition comprising a vinyl resin of the class consisting of the polyvinyl chlorides and the copolymers of vinyl chloride and vinyl acetate and, as a plasticizer therefor, di-(2-ethylhexyl) 2-(dicyclohexylphosphono)-succinate.

11. A plastic composition comprising a vinyl resin containing a vinyl halide in the polymer and, as a plasticizer therefor, a compound having the formula

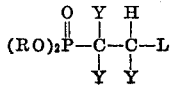

wherein R designates a radical selected from the class consisting of the alkyl, aryl, aralkyl, cycloalkyl, alkenyl, alkoxyalkyl, aryloxyalkyl, tetrahydrofurfuryl and beta-halogen-substituted ethyl radicals; L designates a radical of the class consisting of the —COOR', —CONH$_2$, —CONHR, —CONR$_2$ and —CN radicals wherein R' designates the radicals represented by R with the exception of the aryl radicals; and each Y designates a radical of the class consisting of hydrogen, the aryl radicals and alkyl radicals, and the group of radicals designated by L and by —(CH$_2$)$_n$L wherein $n$ is an integer from 1 to 5, and at least one Y is selected from the last-named group of radicals.

12. A plastic composition comprising a vinyl resin containing a vinyl halide in the polymer and, as a plasticizer therefor, a hydrocarbyl ester of a 2-(dialkylphosphono) succinic acid.

13. A plastic composition comprising a vinyl resin containing a vinyl halide in the polymer and, as a plasticizer therefor, a hydrocarbyl ester of 2-(dicyclohexylphosphono) succinic acid.

FRANKLIN JOHNSTON.

References Cited in the file of this patent
UNITED STATES PATENTS

| Number | Name | Date |
|---|---|---|
| 2,579,810 | Fields | Dec. 25, 1951 |